PHONOGRAPH APPARATUS

Filed Jan. 13, 1964

INVENTOR.
HENRY E. JOHNSTON
BY
[signature]
ATTORNEY 3,271,035

PHONOGRAPH APPARATUS

Henry E. Johnston, Huntingdon Valley, Pa., assignor to Philco Corporation, Philadelphia, Pa., a corporation of Pennsylvania Filed Jan. 13, 1964, Ser. No. 337,362
11 Claims. (Cl. 274—23)

The present invention relates to phonograph apparatus and particularly to apparatus serving to restrain a phonograph tone arm against unwanted movement.

In an automatic phonograph employing a lightweight tone arm, it is desirable to provide means for locking the tone arm in rest position when the phonograph is not in use. Such means prevents injury to the pickup stylus by assuring against accidental dropping of the tone arm from its rest support. For that purpose the tone arm support may be provided with a clip or hook designed to grip the tone arm. However, clip or hook arrangements for the stated purpose are inconvenient in that the user must manually free the tone arm prior to turning on the phonograph. Otherwise the resistance imposed by the firmly held tone arm may result in injury to the automatic cycling mechanism of the phonograph. This inconvenience may be overcome by supplying the phonograph with latch means operable automatically to release the tone arm when the phonograph is switched on. Such means, however, it subject to objections in that after the phonograph is switched off, the user must still manually actuate the latching means to effect retention of the tone arm in rest position.

It is a main feature and object of the invention to provide a tone arm locking and releasing mechanism which avoids the above mentioned objections and drawbacks. To that end the invention provides a novel mechanism which functions automatically to lock the tone arm on the support when the phonograph ceases its record playing operation and which automatically frees the tone arm from the support when the phonograph commences its record playing operation.

It is also a feature and object of the invention to provide a tone arm locking and releasing mechanism which operates conjointly with those instrumentalities employed in an automatic electrically driven phonograph. In accordance with this feature and object, the mechanism of the invention is operatively associated with the phonograph cycling mechanism and particularly with those parts thereof which function to effect automatic shut-off of the phonograph. In this manner the mechanism of the invention has the advantage that it will stay in tone arm unlocking position so long as the phonograph is set to play records, but will move to tone arm locking position when the phonograph is turned off and the tone arm has seated itself on its rest support.

A further feature and object of the invention resides in the provision of a tone arm locking and releasing mechanism adapted for operative connection to working parts of the electrically driven phonograph without changing its basic construction and without modification in its established mode of operation. Thus the invention makes it possible to add an automatically operable arrangement for locking and releasing a tone arm in an automatic phonograph without unduly adding to its production cost.

These, as well as other, features and objectives of the invention are best achieved by providing a phonograph tone arm rest support with improved latching means movable into and out of engagement with the tone arm, and by utilizing novel connective linkage means which cooperatively relates the improved latching means to the phonograph control means. In a preferred embodiment, the invention utilizes an element biased to engage the tone arm and operable in response to an on-off switch control.

The invention and its characteristic features and advantages will be more clearly understood from the following description taken in conjunction with the accompanying drawing, in which.

Figure 1:
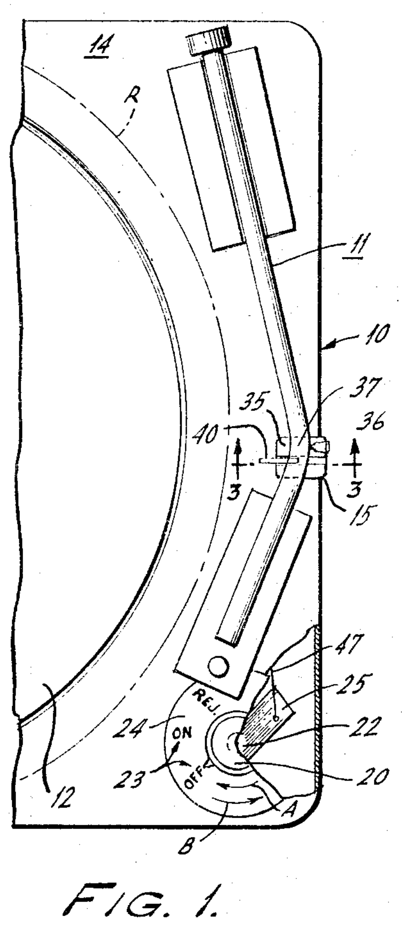
FIGURE 1 is a plan view of a portion of an automatic phonograph incorporating the invention.
Figure 2:
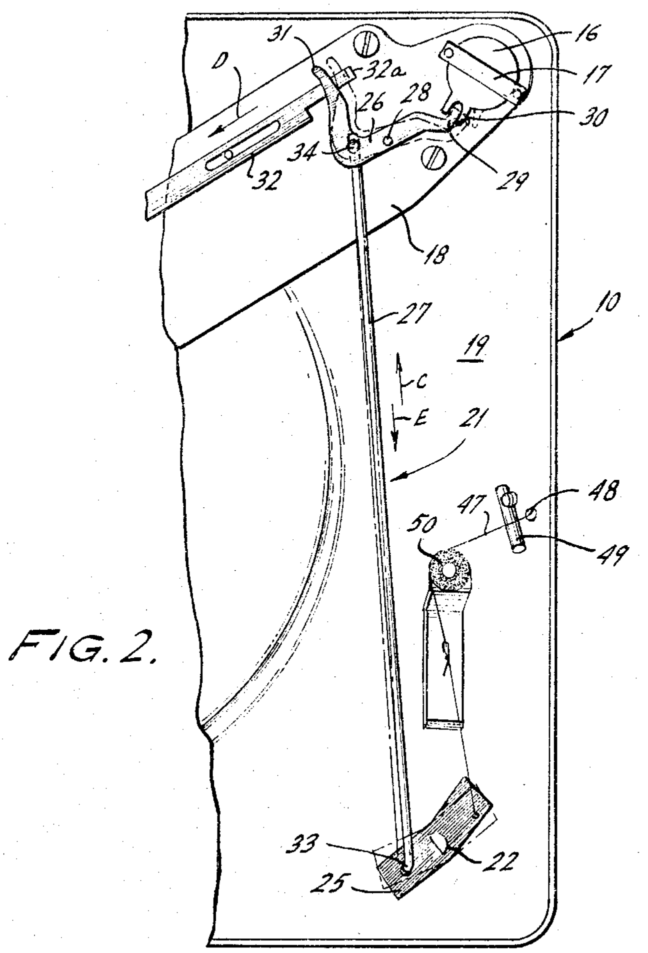
FIGURE 2 is an enlarged bottom view of the portion of the phonograph illustrated in FIGURE 1.

With more particular reference to the drawing there is shown in FIGURES 1 and 2, an electrically driven phonograph in which a horizontal base 10 supports the various parts including tone arm 11, turntable 12 and their associated mechanisms as hereinafter described. As is customary, the tone arm 11 is supported on the upper side 14 of the base to swing both vertically and horizontally for movement into and out of engagement with records deposited on the turntable, the outline of one record being shown at R in FIGURE 1. When the phonograph is turned off and not in use, the tone arm is adapted to seat on a rest support 15 carried in fixed position by the base and disposed to the side of the turntable.

The turntable is rotatably supported on the base and is adapted to be driven in the usual manner by means of a conventional electric motor (not shown). The motor is controlled by on-off switch 16 which, as seen in FIGURE 2, is fixed by strap 17 or other suitable securing means to a bridge 18 mounted on underside 19 of base 10. The switch is adapted for manual operation by means of a rotatable manipulator or knob 20 (FIGURE 1) and linkage assembly 21 (FIGURE 2).

The knob is affixed to a stem 22 rotatably journalled on base 5 and extending transversely therethrough. The knob is disposed and arranged to cooperate with indicia 23 which can be and preferably are imprinted on stationary plate 24 provided on the base. As illustrated linkage assembly 21 is disposed over the underside 19 of the base and includes a rocking arm 25, a bell crank lever 26 and a tie rod 27.

The arm 25 is keyed or otherwise rigidly attached to stem 22 of the switching knob 20. Thus the arm is rocked from inactive position to active position (the positions shown in full lines and in broken lines, respectively, in FIGURE 2) when the knob is rotated in the direction represented by arrow A (FIGURE 1), and is rocked from said active position to said inactive position when the knob is rotated in the direction represented by arrow B (FIGURE 1). The bell crank lever 26 is mounted on a pivot 28 carried by bridge 18, and has a first end portion 29 disposed for engagement with switch actuator 30. The lever also has a second end portion 31 disposed for engagement by a hook-shaped portion 32*a* of slide 32 which is part of the phonograph cycling mechanism, and the tie rod 27 has an end portion 33 which is connected to rocking arm 25 and another end portion 34 which is connected to bell crank lever 26.

By reason of the above described construction it will be understood that when the knob 20 is manually moved from OFF position to ON position, that is in the direction of arrow A in FIGURE 1, the arm 25 is rocked in a direction which, as seen in FIGURE 2, moves rod 27 in the direction of arrow C to initiate the operation of the phonograph by swinging lever 26 and switch actuator 30 from switch-closing position (full line position in FIGURE 2) to switch-opening position (broken line position in FIGURE 2). Also it will be understood that upon actuation of slide 32 in the direction of arrow D in FIGURE 2 (which actuation takes place when the usual automatic final shut-off mechanism operates following the playing of the last record selected to be played on the turntable) the hook shaped portion 32*a* of the slide is brought in engagement with lever 26 to swing the same, together with switch actuator 30, from the aforesaid switch-opening position to the aforesaid switch-closing position. In this latter swinging motion the lever 26 moves tie rod 27 in direction of arrow E to rock the arm 25 back to its above mentioned inactive position thereby effecting automatic rotation of knob 20 from ON position to OFF position. When this occurs the operation of the photograph is terminated and the tone arm is seated on its rest support where, in accordance with the invention, the tone arm is to be restrained positively against accidental movement.

For that latter purpose tone arm rest support 15 is constructed with an upwardly facing platform 35 and a vertically extended post 36, said platform and post providing surfaces against which an intermediate portion 37 of the tone arm abuts. The tone arm rest support 15 is further constructed with a slot 38 for the reception of a latching finger 40 having opposite end portions 41 and 42. The end portion 41 of finger 40 is disposed within the slot 38 and is pivotally anchored to rest support 15 by means of a pin 43. The other or free end portion 42 of finger 40 protrudes outwardly from slot 38 and is contoured to engage the tone arm portion 37 and to cooperate with the aforementioned surfaces provided by platform 35 and post 36 to retain the tone arm firmly on its rest support.

Figure 3:
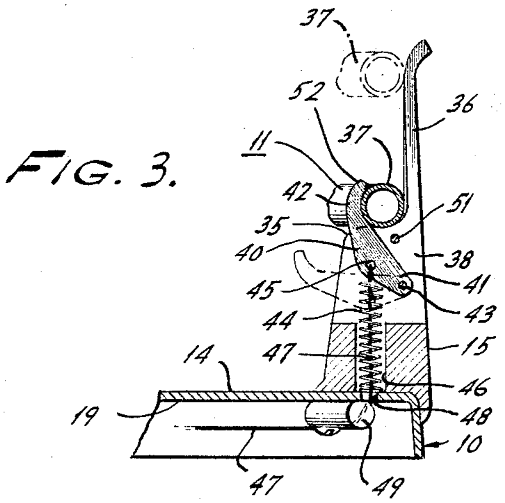
FIGURE 3 is an enlarged cross sectional view taken substantially on lines 3—3 of FIGURE 2.

As best illustrated in FIGURE 3, finger 40 is normally urged into tone arm engaging position by means of a coil spring 44 bearing against an intermediate portion 45 of the finger and fitted in a bore 46 formed in rest support 15. The finger 40 is movable on pivot pin 43 from tone arm engaging position to tone arm disengaging position as represented in broken lines in FIGURE 3.

In accordance with the invention movement of the finger to and from its two positions is accomplished in response to operation of the hereinbefore described linkage assembly. For that purpose finger 40 is coupled by means of a cord 47 to rocking arm 25. As shown in FIGURE 3 the cord is threaded through coil spring 44 and through an aperture 48 in base 10 and, as seen in FIGURE 2, the cord then passes over a guide element 49 and pulley 50 mounted on the underside 19 of the base and is attached to rocking arm 25. Because of this construction it will be understood that finger 40 moves, against the force of spring 44, to tone arm disengaging position simultaneously with actuation of the linkage assembly to initiate operation of the phonograph, and moves under influence of the spring into tone arm engaging position simultaneously with actuation of the linkage assembly to terminate the operation of the phonograph.

Figure 4:
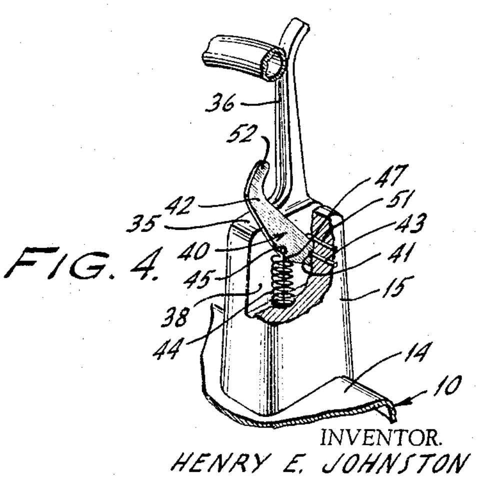
FIGURE 4 is a perspective view of parts shown in FIGURE 3 and illustrates certain features of the invention.

At times it may become desirable or necessary to lift the tone arm manually from its rest support while the phonograph is shut off. Under such condition the finger 40 is limited in its movement toward post 36 by means of a stop which can and preferably is provided by a pin 51 (FIGURES 3 and 4) affixed to the support and traversing slot 38 therein. It will be noted that the vertically extended post 36 constitutes means serving to locate and stabilize the tone arm in its movement to and from its position of rest, when the tone arm is lifted and lowered either automatically or manually. In this respect it should be noted that tip 52 of latching finger end portion 42 is so terminated and shaped that the latching finger will be displaced by the tone arm when manually lifted off and lowered onto its rest support.

From the foregoing description, it will be appreciated that the arrangement of the invention, while of simple construction, is most effective to insure positive retention of the tone arm as long as the phonograph is switched off and not in use, and to effect automatic release of the tone arm for its record playing function when the phonograph is set in operation. Although a preferred embodiment of the invention has been shown and described, it will be understood that the invention is not necessarily limited to that embodiment but embraces such changes and modifications as come within the scope of the appended claims.

What I claim is:

1. In an electrically driven record-playing phonograph having a cycling mechanism and a tone arm moved thereby to and from rest position and record-playing position, the combination of a switch movable to OFF position for deenergizing the cycling mechanism and to ON position for energizing the cycling mechanism, first means for moving the switch between the ON and OFF positions, second means included in the cycling mechanism and actuated thereby for moving the switch from ON position to OFF position, linkage means linking the switch to the first and second means and operated thereby for imparting the aforesaid movements to the switch, and tone arm engaging means connected to and operated by the linkage means for automatically securing the tone arm in rest position upon de-energization of the cycling mechanism and for automatically releasing the tone arm for placement in record-playing position upon energization of the cycling mechanism.

2. In an electrically driven record-playing phonograph, the combination set forth in claim 1, wherein the mentioned first means includes a manual knob displaceable between ON and OFF positions and connected with the linkage means to operate the same for moving the switch between ON and OFF positions independently of the mentioned second means.

3. In an electrically driven record-playing phonograph, the combination set forth in claim 1, wherein the linkage means includes a rocking arm connected to the mentioned first means, a bell crank lever engaging the switch and disposed for engagement by the mentioned second means, and a tie rod interconnecting said arm and lever to transmit motion from the first means to move the switch to ON and OFF positions and to transmit motion from the second means to move the switch to OFF position.

4. In an electrically driven record-playing phonograph, the combination set forth in claim 1, wherein the mentioned first means includes a manual knob displaceable between ON and OFF positions and connected with the linkage means to operate the same for moving the switch between ON and OFF positions independently of the mentioned second means; the linkage means including a rocking arm connected to the mentioned first means, a bell crank lever engaging the switch and disposed for engagement by the mentioned second means, and a tie rod interconnecting said arm and lever to transmit motion from the knob to move the switch to ON and OFF positions and to transmit motion from the second means to move the switch to OFF position.

5. In an electrically driven record-playing phonograph, the combination set forth in claim 1, wherein the tone arm engaging means includes a support for seating of the tone arm in rest position, a finger carried by the support for movement into and out of engagement with the tone arm, spring means in engagement with the finger and normally biasing the same into engagement with the tone arm when seated on the support, and a cord attached to the finger and linkage means to move the finger out of engagement with the tone arm against the biasing action of the spring means.

6. In an electrically driven record-playing phonograph, the combination set forth in claim 1, wherein the mentioned first means includes a manual knob displaceable between ON and OFF positions and connected with the linkage means to operate the same for moving the switch between ON and OFF positions independently of the mentioned second means; the tone arm engaging means including a support for seating of the tone arm in rest position, a finger carried by the support for movement into and out of engagement with the tone arm, spring means in engagement with the finger and normally biasing the same into engagement with the tone arm when seated on the support, and a cord attached to the finger and linkage means to move the finger out of engagement with the tone arm against the biasing action of the spring means.

7. An electrically driven record-playing phonograph, the combination set forth in claim 1, wherein the linkage means includes a rocking arm connected to the mentioned first means, a bell crank lever engaging the switch and disposed for engagement by the mentioned second means, and a tie rod interconnecting the said arm and lever to transmit motion from the knob to move the switch to ON position and to transmit motion from the second means to move the switch to OFF position; the tone arm engaging means including a support for seating of the tone arm in rest position, a finger carried by the support for movement into and out of engagement with the tone arm, spring means in engagement with the finger and normally biasing the same into engagement with the tone arm when seated on the support, and a cord attached to the finger and linkage means to move the finger out of engagement with the tone arm against the biasing action of the spring means.

8. In an electrically driven record-playing phonograph, the combination set forth in claim 1, wherein the mentioned first means includes a manual knob displaceable between ON and OFF positions and connected with the linkage means to operate the same for moving the switch between ON and OFF positions independently of the mentioned second means; the linkage means including a rocking arm connected to said knob, a bell crank lever engaging the switch and disposed for engagement by the mentioned second means, and tie rod interconnecting said arm and lever to transmit motion from the knob to move the switch to ON and OFF positions and transmit motion of the second means to move the switch to OFF position; the tone arm engaging means including a support for seating of the tone arm in rest position, a finger carried by the support for movement into and out of engagement with the tone arm, spring means in engagement with the finger and normally biasing the same into engagement with tone arm when seated on the support, and a cord attached to the finger and to the rocking arm to move the finger out of engagement with the tone arm against the biasing action of the spring means.

9. In an electrically driven record-playing phonograph having a tone arm movable to and from a rest position and record-playing position, the combination of a switch movable to OFF position for stopping the phonograph and to ON position for starting the phonograph, a manually operable element for moving the switch between ON and OFF positions, an automatically operable member for moving the switch from ON position to OFF position, linkage means linking the switch to said element and member and operable in response thereto for imparting the aforesaid movements to the switch, and tone arm engaging means connected to and operated by the linkage means for automatically securing the tone arm in rest position when the phonograph is stopped and automatically releasing the tone arm for placement in the record-playing position when the phonograph is started.

10. In an electrically driven record-playing phonograph, the combination set forth in claim 9, wherein the linkage means includes a rocking arm connected to the manually operable element, a bell crank lever engaging the switch and disposed for engagement by the automatically operable member, and a tie rod interconnecting said arm and lever to transmit motion from the manually operable element to the switch and to transmit motion from the automatically operable member to the manually operable element.

11. An electrically driven record-playing phonograph, the combination set forth in claim 9, wherein the tone arm engaging means includes a support for seating of the tone arm in rest position, a finger carried by the support for movement into and out of engagement with the tone arm, spring means in engagement with the finger and normally biasing the same into engagement with the tone arm when seated on the support, and a cord attached to the finger and to the linkage means to move the finger out of engagement with the tone arm against the biasing action of the spring.

References Cited by the Examiner

UNITED STATES PATENTS

| | | | |
|---|---|---|---|
| 2,955,825 | 10/1960 | Starr | 274—23 |
| 2,956,830 | 10/1960 | Dennis | 274—23 |

FOREIGN PATENTS

| | | |
|---|---|---|
| 971,147 | 12/1958 | Germany. |

NORTON ANSHER, *Primary Examiner.*

Disclaimer

3,271,035.—*Henry E. Johnston*, Huntingdon Valley, Pa. PHONOGRAPH APPARATUS. Patent dated Sept. 6, 1966. Disclaimer filed Sept. 19, 1968, by the assignee, *Philco-Ford Corporation*.

Hereby enters this disclaimer to claims 1, 2, and 9 of said patent.

[*Official Gazette January 28, 1969.*]